(12) United States Patent
Balta et al.

(10) Patent No.: US 11,593,498 B2
(45) Date of Patent: Feb. 28, 2023

(54) DISTRIBUTION OF USER SPECIFIC DATA ELEMENTS IN A REPLICATION ENVIRONMENT

(71) Applicant: International Business Machines Corporation, Armonk, NY (US)

(72) Inventors: Trent Matthew Balta, Poughkeepsie, NY (US); Anthony Thomas Sofia, Hopewell-Junction, NY (US); Michael Terrence Cohoon, Fishkill, NY (US); Torin Reilly, Beacon, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 282 days.

(21) Appl. No.: 16/896,289

(22) Filed: Jun. 9, 2020

(65) Prior Publication Data

US 2021/0383006 A1 Dec. 9, 2021

(51) Int. Cl.
*G06F 21/62* (2013.01)
*G06F 16/178* (2019.01)

(52) U.S. Cl.
CPC ........ *G06F 21/6218* (2013.01); *G06F 16/178* (2019.01)

(58) Field of Classification Search
None
See application file for complete search history.

(56) References Cited

U.S. PATENT DOCUMENTS

| | | | |
|---|---|---|---|
| 7,383,407 B1 | 6/2008 | Kiselev | |
| 7,555,493 B2 | 6/2009 | Khayter et al. | |
| 8,214,353 B2* | 7/2012 | Inturi | G06F 16/256 707/715 |
| 9,519,555 B2 | 12/2016 | Calder et al. | |
| 2016/0004877 A1* | 1/2016 | Hayes | H04L 9/0894 713/165 |
| 2016/0224259 A1* | 8/2016 | Ahrens | G06F 3/067 |
| 2016/0259574 A1* | 9/2016 | Carpenter | G06F 3/0683 |
| 2017/0316075 A1* | 11/2017 | Deshmukh | H04L 63/102 |
| 2018/0367509 A1 | 12/2018 | O'Hare et al. | |
| 2021/0125007 A1* | 4/2021 | Jayanthi | G06F 11/3006 |

\* cited by examiner

*Primary Examiner* — Brandon Hoffman
(74) *Attorney, Agent, or Firm* — Cantor Colburn LLP; Edward Wixted (57) ABSTRACT

Aspects include receiving a notification that a value of a data element stored in a source storage location in a source format has been changed to an updated value. The change is replicated to a plurality of target storage locations. The replicating includes, for each of the plurality of target storage locations, determining a target format of the data element in the target storage location. The target format is one of a plurality of different formats, including the source format. Each of the different formats provide a different level of data protection for the data element. In response to determining that the target format is not the same as the source format, the updated value of the data element is converted into the target format, and the updated value of the data element is stored in the target format at the target storage location.

18 Claims, 9 Drawing Sheets

DISTRIBUTION OF USER SPECIFIC DATA ELEMENTS IN A REPLICATION ENVIRONMENT

BACKGROUND

The present invention generally relates to computing technology, and more particularly, to distribution of user specific data elements in a replication environment.

Data replication is the frequent electronic copying of data records located in a source data store to a replica data store, either for data recovery or to allow users on multiple computing devices to access data relevant to their tasks without interfering with the work of others. In data storage systems, it is often desirable to have stored data replicated in multiple locations so that the data is available locally in each of the locations. Each location has a local data storage device which can satisfy requests to read data on its own without needing to query other data storage devices of the data storage system.

SUMMARY

Embodiments of the present invention are directed to distribution of user specific data elements in a replication environment. A non-limiting example method includes receiving a notification that a value of a data element stored in a source storage location in a source format has been changed to an updated value. The change is replicated to a plurality of target storage locations. The replicating includes, for each of the plurality of target storage locations, determining a target format of the data element in the target storage location. The target format is one of a plurality of different formats, including the source format. Each of the different formats provide a different level of data protection for the data element. In response to determining that the target format is not the same as the source format, the updated value of the data element is converted into the target format, and the updated value of the data element is stored in the target format at the target storage location.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or to the operations described therein without departing from the spirit of the invention. For instance, the actions can be performed in a differing order, or actions can be added, deleted, or modified. Also, the term "coupled," and variations thereof describe having a communications path between two elements and do not imply a direct connection between the elements with no intervening elements/connections between them. All of these variations are considered a part of the specification.

DETAILED DESCRIPTION

One or more embodiments of the present invention provide distribution of user specific data elements in a replication environment. Change data capture techniques are used to determine and track data that has changed so that action(s) can be taken using the changed data. Change data capture technology can be used, for example, to keep a database system synchronized with low latency. For such change data captures, the database system replicates instructions to change one or more data elements in the database. For example, such instructions to change a data element can include Structured Query Language (SQL) INSERT, UPDATE, and DELETE instructions. In a database system that implements change data capture, such instructions change the data element(s) between a source database and replica, or target, databases.

Regardless of the exact methods used to process and capture data, the source table/target table relationship generally takes on one of the following forms: a single source table feeding into a single target table; a single source table feeding into multiple target tables; or a single source table feeding into a single target table which thereafter spreads data further into multiple target tables to form a multi-tier system.

Embodiments of the present invention facilitate secure updates to the stored data when using the change data capture in a database environment. One or more embodiments of the present invention concentrate on the point where data is spread from one to many database tables and include a process that transforms the data fields which share a column name into secured data. As used herein, the term "secured data" refers to data that has either been encrypted or transformed. The secured data is applied transparently through the replication process but can apply different levels of security based on the destination tables. For example, one target table may store a secured data element in an encrypted form and another target table may store the secured data element in a format preserving form. One or more embodiments of the present invention described herein provide synchronization between the source change table and the target change tables with the secured data.

The process of securing data during replication requires having the data be applied to the target in a protected state. The UPDATE/INSERT/DELETE instruction can be logged into the source change table along with the new values and a timestamp. The data can then be applied to the target table in one of two ways. The first way is by copying data from the source change table directly to a target table by executing the SQL operations. A second manner of applying the data to the target table(s) includes copying data from the source change table into a secondary change table. The data is examined and, if it is a secure data field, secured through a process that can include input from a central securing mechanism to encrypt or transform the data via any number of available cryptography standards. The data is then copied into the target table(s). One or more embodiments facilitate the second manner of applying the data to the target tables(s) when different levels of security, or protection, for the same data field are required in different target tables.

Change data capture is utilized by one or more embodiments of the present invention to capture data from a database update log and to capture the update records into a change table with updated records as well as metadata. The change table is then used to apply only the updated records into replicas of the original database.

Figure 1:
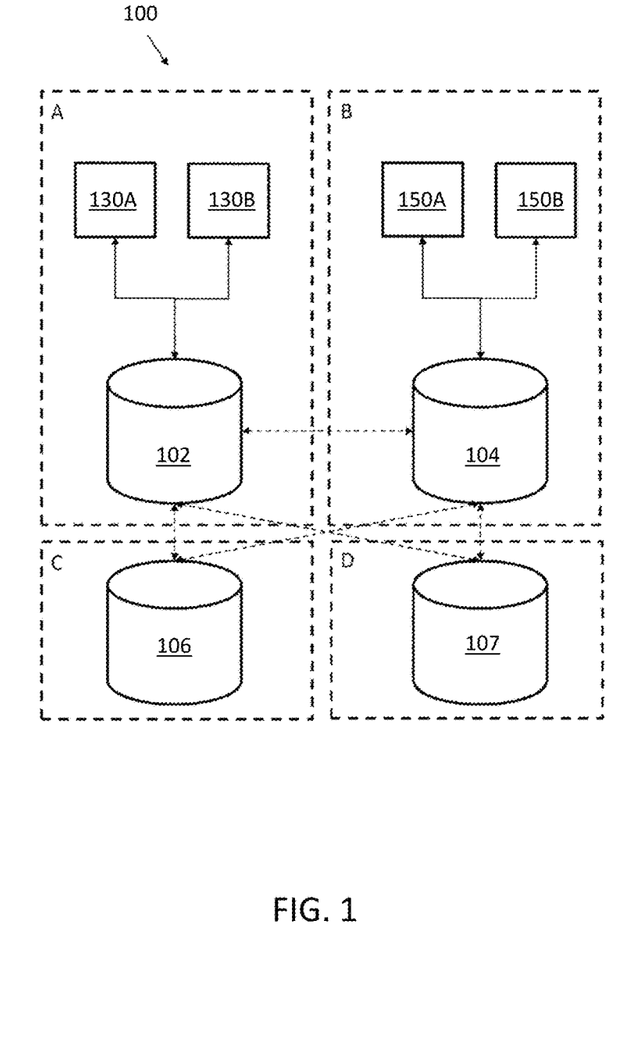
FIG. 1 is a schematic diagram of a data storage system in accordance with one or more embodiments of the present invention.

FIG. 1 depicts a database system that implements change data capture according to one or more embodiments of the present invention. The database system 100 includes at site A, a first data storage device 102 and host devices 130A and 130B, amongst others, in communication with the first data storage device 102. The host devices 130A and 130B make requests to read data from and write data to the first data storage device 102. The database system 100 further includes, at a site B, a second data storage device 104 and host devices 150A and 150B, amongst others, in communication with the second data storage device 104. Similarly, the host devices 150A and 150B make requests to read data from and write data to the second data storage device 104.

The first data storage device 102 and second data storage device 104 are in communication with each other so that the data they store, including any updates to the data made by requests to write data, is replicated at each of sites A and B.

The database system 100 further includes, at a site C, a third data storage device 106, and, at a site D, a fourth data storage device 107. Unlike the first data storage device 102 at site A and the second data storage device 104 at site B, the third data storage device 106 and fourth data storage device 107 are not in communication with any host devices. As a result, the third data storage device 106 and fourth data storage device 107 will not receive any requests to read or write data. Such sites with data storage devices that are not themselves receiving write requests from host devices, and so are merely acting as copies of data stored elsewhere, are described herein as non-active sites.

However, the third data storage device 106 and fourth data storage device 107 are each in communication with the first data storage device 102 and the second data storage device 104, and each replicates the data stored at each of site A and B. In use, the third data storage device 106 and fourth data storage device 107 might, for example, be maintained while the migration is being done from one site to another (e.g., from site A to site C), while site A is remaining in active use; or to provide a backup for use in the case one of the first data storage device 102 or second data storage device 104 fails.

While in the embodiment shown in FIG. 1 the third data storage device 106 and fourth data storage device 107 are located at different sites from the first data storage device 102 and the second data storage device 104, in alternative embodiments one or both may be located at the same site as first data storage device 102 or the second data storage device 104. Further, while in the embodiment shown in FIG. 1, site A and site B, each includes only a single data storage device in communication with host devices, in other alternative embodiments sites may include multiple data storage devices in communication with one or more host devices.

The first data storage device 102 and second data storage device 104 can replicate data between themselves.

It is understood that the shown data storage devices and sites are just one example embodiment of the present invention and that in other embodiments of the present invention, the number of sites, storage devices, and their organization can vary from the depicted example. In addition, the embodiments described herein with respect to the database system 100 of FIG. 1 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments Turning now to FIG. 2, a block diagram and operational flow for changing a data element in a data storage device, such as first data storage device 102 of FIG. 1, is generally shown in accordance with one or more embodiments of the present invention. It is understood that although, in the examples described herein, the data storage devices store data using a table data structure, the data storage devices can store the data using other types of data structures, which can also be updated in substantially the same manner as a table. A data element can be, but is not limited to, a particular data field in a table (e.g., a cell represented by a particular row-column combination), an entire row in the table, and/or an entire column in the table.

It should be noted that the figures herein depict target tables being changed per example requests. It is understood that the changes are also being made in a source table. While the target tables are shown with the change, the change is not shown in the source table so as to depict to the reader, the two states of the data—before the request (in the source table), and after the request completes (in the target tables). In accordance with one or more embodiments of the present invention, the database system, such as database system 100 of FIG. 1, implements the changes in the target tables if the request is first hardened in the source table. Accordingly, the figures herein depict the mechanics of an update to the source table that triggers the replication in the target tables, however, changes to the source table itself are not depicted herein, and it should be understood that such changes are made by the database system without affecting the technical solutions provided by one or more embodiments of the present invention.

Figure 2:
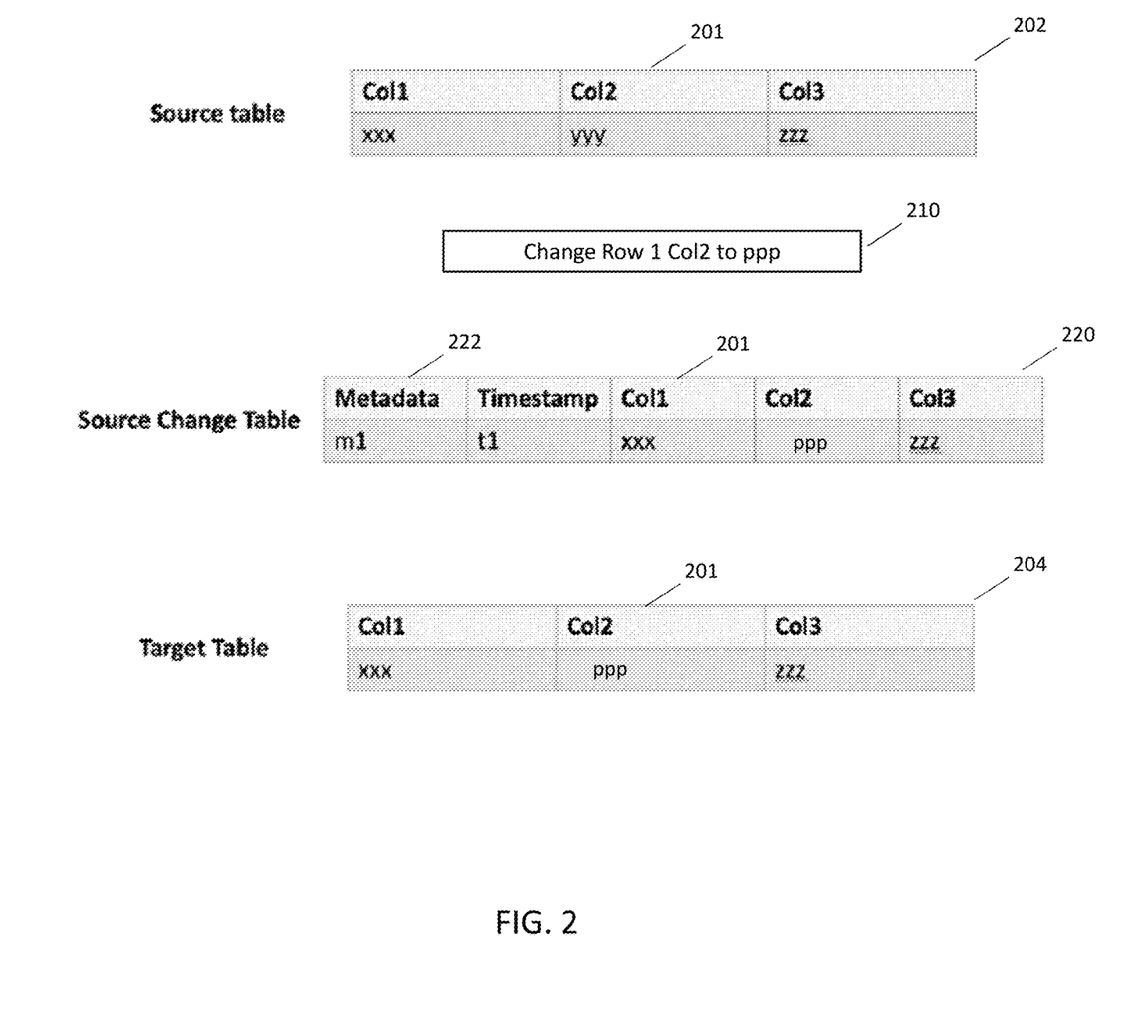
FIG. 2 depicts a block diagram and operational flow for changing a data element in a data storage device in accordance with one or more embodiments of the present invention.

Consider, in the example scenario of FIG. 2, that the source table 202 includes data elements, and that one or more data elements are to be updated by an instruction 210. In the example scenario shown in FIG. 2, the data element 201 being changed is the field represented by row-1, col-2, such that the existing value of "yyy" is being changed to "ppp." It should be further noted that the data values can be different in other embodiments of the present invention. Also, one skilled in the art will appreciate that the number of rows and columns in table 202 is exemplary and that in one or more embodiments of the present invention the table 202 can include a different number of rows and columns. Further yet, while the example scenario depicts an "update" operation that changes an existing value, in one or more embodiments of the present invention, the change can include inserting a new value or deleting an existing value.

Referring to the example scenario, the instruction 210 changes the source table 202 to a target table 204. For changing the data per the instruction 210, by using data change capture techniques, the database system creates a source change table 220 in response to the instruction 210. The source change table 220 is an intermediate data structure that stores update records. The update records that are stored in the source change table 220 contain the values that are going to be applied to the target table 204. The database system subsequently uses an apply process that transforms the data elements that are to be updated; in this case, the data element 201. In one or more embodiments of the present invention, the data elements that are to be updated are noted in a metadata portion 222 of the source change table 220. In one or more embodiments of the present invention, the metadata portion 222 of the source change table 220 can further indicate an operation that is to be performed for the change to be applied. The source change table 220 can store several such changes that are to be applied to the target table 204. The database system executes one or more computer-executable instructions to apply these changes. The changes can be applied in a sequential manner in one or more embodiments of the present invention. Alternatively, in one or more embodiments of the present invention, the database system applies the changes in a more efficient out-of-order manner, by analyzing the changes being made, and skipping any redundant changes.

Technical challenges exist with such change capture techniques when applied to a distributed database system when the data elements are to be secured, such as by encryption, masking, or any other technique to secure the values stored in the database tables. For example, when a data element is to be updated, the source change table 220 can include values for the data element that are to be applied to the target table 204. Contemporary methods of replication do not secure these values for the data elements, and hence these values are vulnerable. Here, "value" of the data element can also be referred to as the "content" of the data element.

Such technical challenges are addressed by one or more embodiments of the present invention that facilitate protecting each data element in the change table that is going to be applied to the target table 204. In one or more embodiments of the present invention, the data elements are transformed into secured data, and such secured data is then applied to the target table 204 using existing replication techniques. The replication can apply the changes to the multiple sites in a database system, such as database system 100 of FIG. 1. In accordance with one or more embodiments of the present invention, the secured data can be in different formats in different target tables in the database system.

Figure 3:
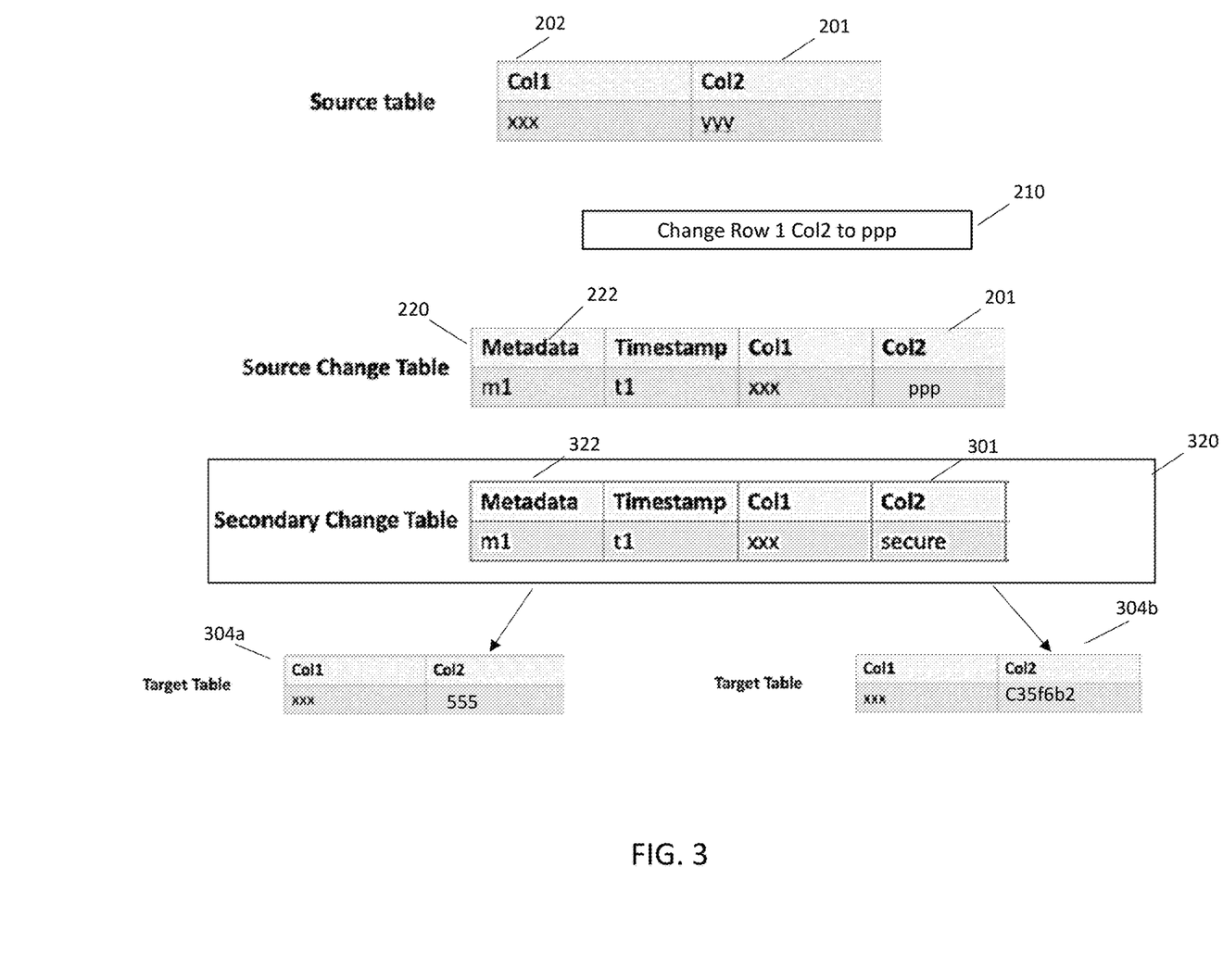
FIG. 3 depicts a block diagram and an operational flow for securely replicating data changes to a plurality of tables in accordance with one or more embodiments of the present invention.

Turning now to FIG. 3, a block diagram and an operational flow for changing a data element in two or more target tables in a secure manner is generally shown in accordance with one or more embodiments of the present invention. The processing shown in FIG. 3 can be executed by one or more processing units that are part of the database system 100 of FIG. 1 and/or by one or more cloud computing nodes 10 of FIG. 7. Implementing techniques described in FIG. 3 improves the security of the data stored in a database system, such as database system 100 of FIG. 1, and allows the secured data to be stored in different formats in different target tables. Consider the same example scenario again, where the data element 201 is a field being updated by the change instruction 210 from "yyy" to "ppp."

As shown in FIG. 3, changes to source table 202 are replicated to source change table 220 and then copied to a secondary change table 320 in order to be secured if needed. In the example shown in FIG. 3, data element 201 in Column 2 which is in a string data that is required to be in a secure format. One or more embodiments of the present invention disperse the data in the secondary change table 320 to different target tables 304a 304b (referred to herein collectively as target tables 304) with the data element in different formats. As shown in the example in FIG. 3, target table 304a receives a version of the data element that is still in a string format but is in a masked value string format (which is different than the format in the source change table 220), and target table 304b receives an encrypted version of the data element in an encrypted format that can be inspected and returned to its original value (e.g., using input from a central securing mechanism).

Two target tables 304 are shown in FIG. 3 for ease of description, however one skilled in the art will appreciate that any number of target tables 304 may be implemented by one or more embodiments of the present invention. Each of the target tables 304 may include the data element in a different format than the other tables or their formats may overlap between two or more of the target tables 304. Different protection levels (e.g., data formats) can be determined for the data element for each of the target tables 304 based on, but not limited to: a table name, an owner of the table, a user of the table, and/or a physical location of the table.

Referring to FIG. 3, embodiments of the present invention create a copy of the source change table 220. The copy is referred to herein as a "secondary change table" 320, however, the copy can be referred by any other term in other embodiments of the present invention. In accordance with one or more embodiments of the present invention, the secondary change table 320 only includes those update records from the source change table 220 that have not yet been applied to the target tables 304. In one or more embodiments of the present invention, the secondary change table 320 is created periodically, at a predetermined frequency, such as every ten seconds, every two minutes, or any other frequency.

Creating the secondary change table 320 can include deleting an existing instance of the secondary change table 320 and creating a new instance of the secondary change table 320. In one or more embodiments of the present invention, when creating an instance of the secondary change table 320, the database system checks the timestamp of the update record in the source change table 220. The timestamp in an update record indicates when that update record was created. Using the timestamp, only those update-records that have been created within a predetermined duration from the present time, when the instance is being created, are copied into the instance of the secondary change table 320.

When the instance of the secondary change table 320 is being created, the data element identifiers, for example, column names, are examined to determine if the data that is in the source change table 220 is to be secured. A user/administrator can specify which data elements are to be secured and their respective formats in the different target tables 304. For example, such specifications can be stored in the user settings of the database system. Accordingly, the database system (e.g., a central securing mechanism in the database system) checks the settings to determine if any of the data elements in the source change table 220 are to be secured. If there are any data elements to be secured, for example, the data element 201 in FIG. 3, while making the copy of the data elements into the secondary change table 320, the identified data elements, are secured, and the secured data is stored in a data element 301 in the secondary change table 320. The secondary change table 320 is then used to apply changes to the data elements in the target tables 204.

There can be several approaches for generating secure data when copying values of the data element from the update records in the source change table 220 to the update records in the secondary change table 320. For example, the secure data can be created with a security operation that is reversible. In this case, the data value can be encrypted into an encrypted format, and the resulting ciphertext can include security metadata that facilitates reverting the ciphertext to the original data value. The security metadata is stored in the metadata 322 in the secondary change table 320. Alternatively, or in addition, the database system stores the security metadata in other locations on the servers. The database system tracks such related information with the secondary change table 320, so that the data value can be interpreted at a later point to restore it from the ciphertext that is generated by the security function. To facilitate storing the ciphertext, in one or more embodiments of the present invention, the database system changes the schema of the data elements between the source change table 220 and the secondary change table 320. The schema change is required because the securing operation changes the format of the data value that is stored in the original field to the type of data value of the ciphertext. The "type" of data can be a field-type associated with the data element, for example, text, number, string, date, etc.

Other examples of securing the data value can include format preserving methods, such as masking, redactions, randomization, etc. In these cases, the schema of the data element being secured remains unchanged between the source change table 220 and the secondary change table 320. These securing techniques do not change the type of the data value, rather they change the value, or format, of the data that is stored using a specific ciphering formula. Deciphering the original data from the secured data can include applying a reverse of the ciphering formula. In accordance with one or more embodiments of the present invention, the original data can be derived based on the secured data (e.g., encryption was applied to the original data), or the original data can intentionally not be derivable based on the secure data (e.g., masking was applied to the original data).

After such securing, the secondary change table 320 has a potentially modified schema and secured data rather than clear, i.e., non-secured data, in the original form. Updating the data in the database includes performing an "apply process" that pulls changes from the secondary change table 320 (rather than the source change table 220) and applies the changes to the target tables 304. When the updating is completed, the target tables 304 contain secure data from the secondary change table 320. When users request a read from one of the target tables 304, the secured data is retrieved, which then is processed by deciphering the retrieved data. The deciphering can be performed by a central system, such as the database system, or another security server (not shown). Alternatively, the deciphering can be performed locally by a client device (not shown) at the user's end.

In accordance with one or more embodiments of the present invention, the central securing mechanism includes the facilities to secure the data in a plurality of ways, including but not limited to encrypting it into ciphertext or performing a simple transformation. Which method to apply for each target table can be determined, for example, by reading the target name, reading from a stored list of actions, etc., and deciding based on that which function central securing mechanism to call for each table.

Figure 4:
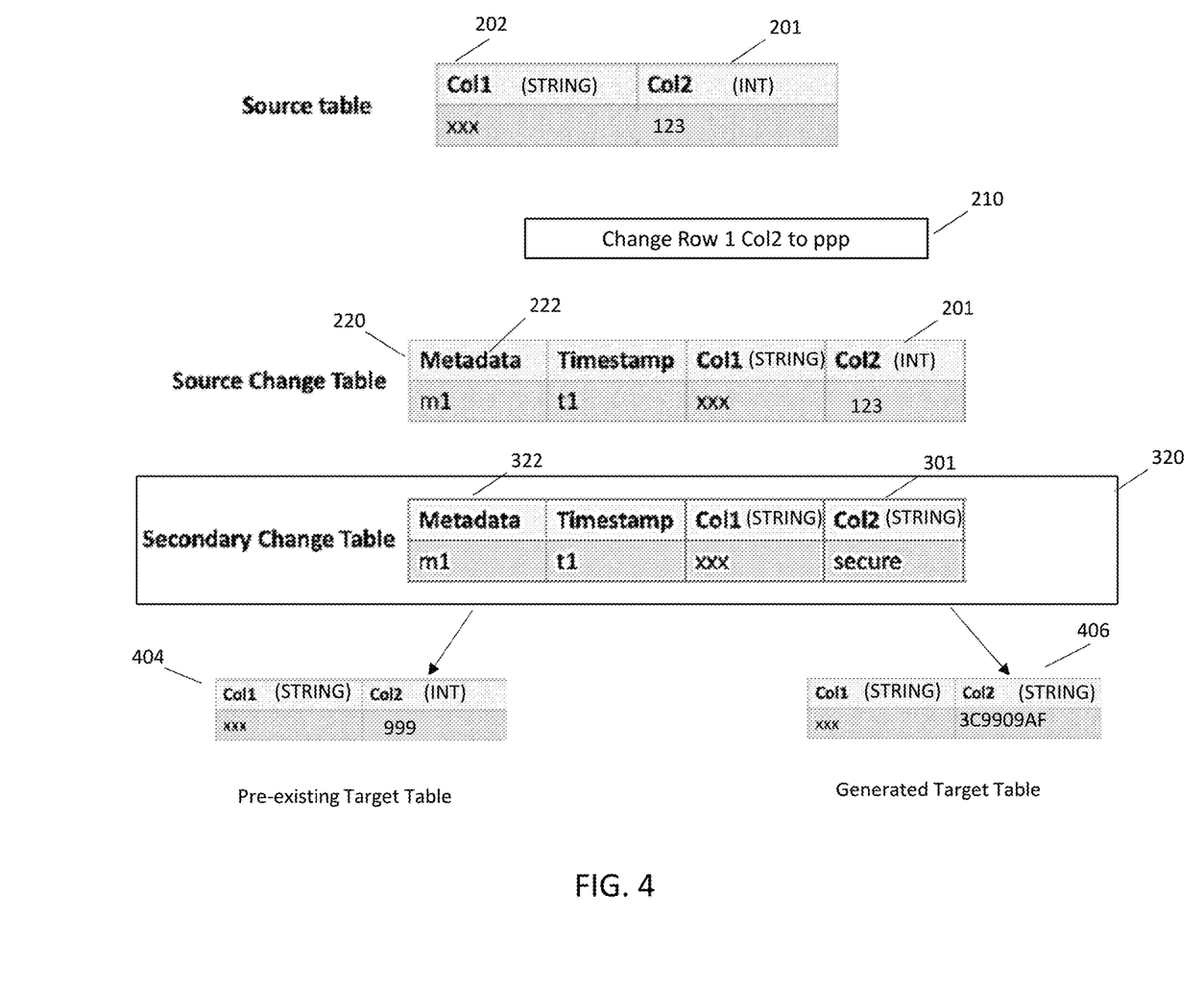
FIG. 4 depicts a block diagram and an operational flow for creating a target table in accordance with one or more embodiments of the present invention.

Turning now to FIG. 4, a block diagram and an operational flow for creating a target table that includes secure data is generally shown in accordance with one or more embodiments of the present invention. The processing shown in FIG. 4 is similar to that in FIG. 3, however, the target tables include a pre-existing target table 404 and a newly generated target table 406. The processing shown in FIG. 4 can be executed by one or more processing units that are part of the database system 100 of FIG. 1 and/or by one or more cloud computing nodes 10 of FIG. 7. One or more embodiments of the present invention can be utilized to create a target table, such as generated target table 406, rather than simply inserting rows into a pre-existing target table, such as pre-existing target table 404. In the example of the newly generated target table 406 shown in FIG. 4, the schema of the source table 202 is not used. Instead, the schema of the target table 406 includes the schema of the source table 202 augmented with the schema of the protected element being inserted (e.g., based on the type of the protected element being inserted).

As shown in FIG. 4, the pre-existing target table 404 holds the same schema as the source table 202 since the protected values being inserted, while having a different format (i.e., masked integer vs. integer) are still integers. Thus, since the source table 202 and the pre-existing target table 404 have columns of the same type, they can use the same schema. As shown in FIG. 4, the generated target table 406 has a modified schema since the format used for the secured value of the data element 301 has a type of string (and not integer as in the source table 202).

Figure 5:
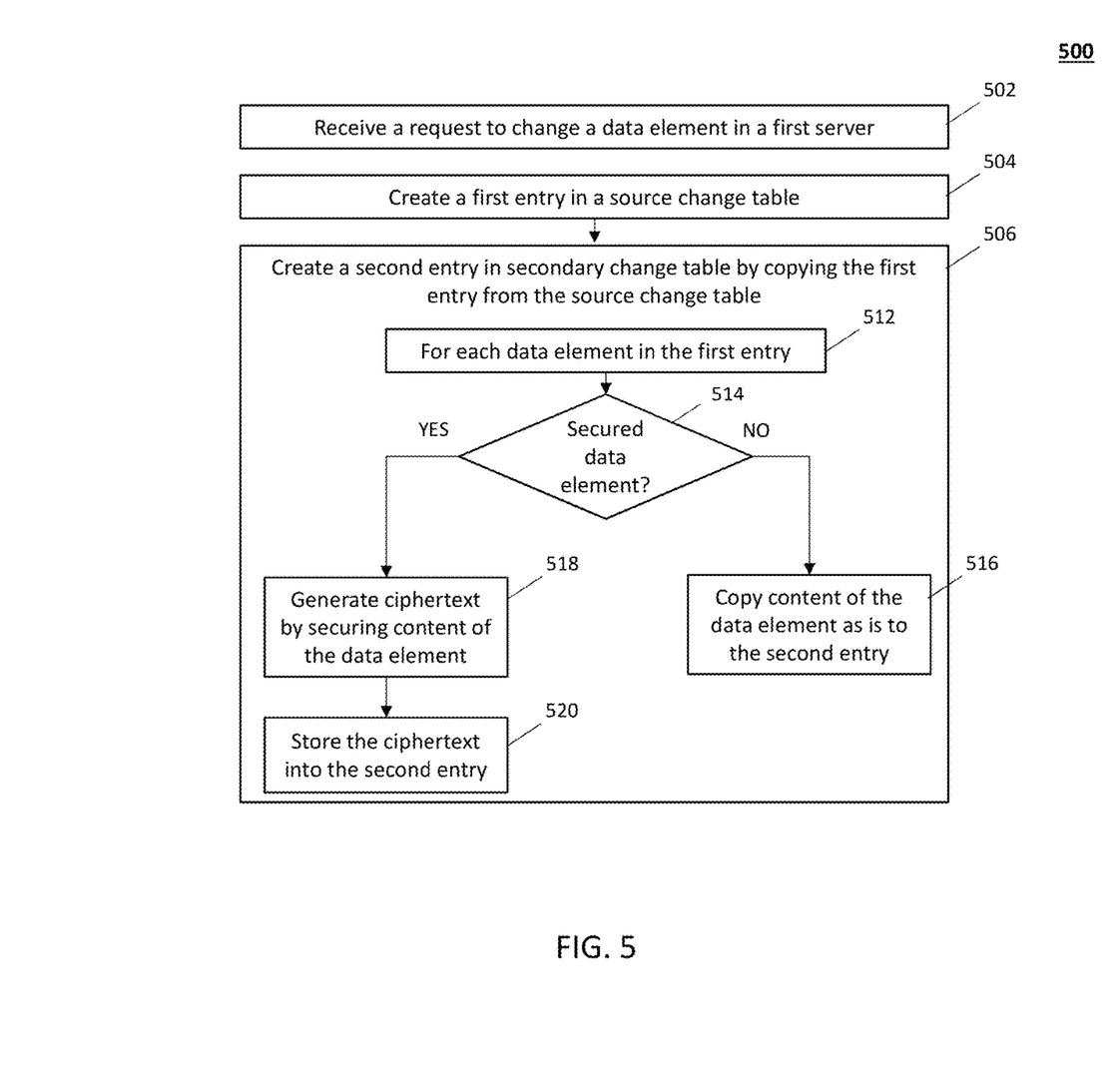
FIG. 5 depicts a flowchart of a method for securing data replication in distributed data storage environments according to one or more embodiments of the present invention.

Turning now to FIG. 5, a flowchart of a method 500 for securing data replication in distributed data storage environments is generally shown in accordance with one or more embodiments of the present invention. The method 500 can be executed by one or more processing units that are part of the database system 100 of FIG. 1 and/or by one or more cloud computing nodes 10 of FIG. 7. The method 500 begins at block 502 with receiving an instruction 210 to change a data element in a storage device, such as the first data storage device 102 of FIG. 1. The instruction 210 can be in the form of a computer-executable instruction using SQL or other such programming languages. Further description of the flowchart is provided using the example scenario that is described herein with respect to the change instruction 210 in FIG. 2 and FIG. 3.

An entry in the source change table 220 is created in response to the instruction 210 that is received, at block 504. The entries in the source change table 220 include update-records that are to be applied to the source table 202. Each entry includes data elements that are to be updated from the source table 202. The database also includes a target tables 304 in which the changes from the source change table 220 are applied. The target tables 304 can then be used for responding to subsequent queries.

The method 500 further includes creating a copy of the entry from the source change table 220 in the secondary change table 320, at block 506. The copy is created only for an entry that is new, i.e., with a timestamp that indicates that the entry is created after the last iteration of copying entries from the first change-table 220. As noted earlier, entries from the source change table 220 are copied into the secondary change table 320 at a predetermined frequency. In one or more embodiments of the present invention, making such copies can be manually initiated by an administrator/user.

Creating the copy includes determining whether the data element 201 that is being changed is a secured data element, at block 514. For example, the data element 201, such as a row, or a field, or a column, can be secured by using an encryption key, a redaction (e.g., a mask), a randomization algorithm, or any other securing algorithm. Alternatively, the data element 201 may not be secured. The user settings associated with the data storage device can include information on whether the data element 201 is secured. Alternatively, or in addition, the user settings can be associated with a database that is stored in the data storage device, the database including the source table 202 of which the data element 201 is a part. The database system can check whether the data element 201 is secured based on the user settings. Alternatively, or in addition, the database system can determine the security of the data element 201 based on the metadata of the data element 201.

If the data element 201 is not secured, a copy of the data element 301 is made in the entry in the secondary change table 320 as is, i.e., without securing the content of the data element, at block 516. Alternatively, if the data element 201 is secured, the content of the data element 301 is secured using a securing algorithm, which results in ciphertext, at block 518. The processing performed at block 518 to includes determining whether the securing includes a schema/format change of the content.

If format-preserving security is to be applied, the content of the data element from the first entry is transformed into ciphertext using a schema preserving securing algorithm. Examples of schema, or type, preserving security algorithms can include masking, redacting, randomizing characters/elements of the content, or any other such algorithms. In this case, the schema remains unchanged between the content of the data element from the first entry and the ciphertext that is stored in the secondary change table 320. In turn, the schema of the source change table 220 and that of the secondary change table 320 remain unchanged.

In the case where schema preserving security is not applied, the content of the data element from the first entry is transformed into ciphertext using a securing algorithm that may not preserve the format or type. Accordingly, the ciphertext created in this case has a different, i.e., distinct schema from that of the content in the data element from the first entry. For example, the securing algorithm, in this case, can be an encryption algorithm that generates the ciphertext that can include character types that may not be included in the original content in the first entry. In one or more embodiments of the present invention, the ciphertext can be created where the operation is reversible. In this case, the original content is encrypted, and the resulting ciphertext can include security-metadata. Alternatively, the database system 100 tracks the security-metadata, such that the ciphertext can be interpreted at a later point to restore the original content. In turn, the database system 100 changes the schema between the first change-table 220 and the secondary change table 320, as the securing operation changes the type of the data element field.

The ciphertext created at block 518 is then stored in the entry in the secondary change table 320, at block 520. The copy of the data element 301 in the secondary change table 320 is created in this manner by checking and copying the content of each data element in the first entry from the source change table 220, at block 512.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6:
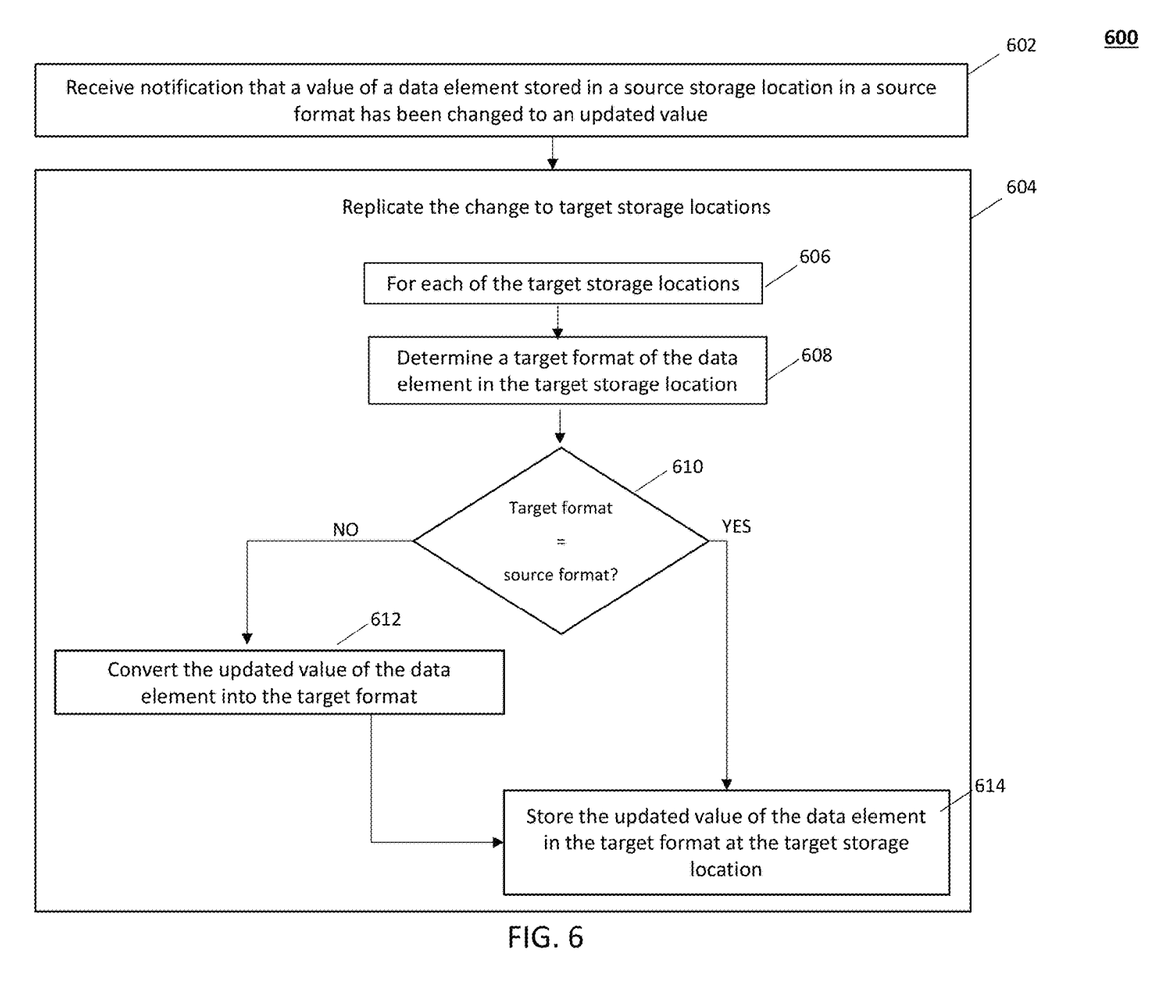
FIG. 6 depicts a flowchart of a method for distributing user specific data elements in a replication environment according to one or more embodiments of the present invention.

Turning now to FIG. 6, a flowchart of a method 600 for distributing user specific data elements in a replication environment is generally shown in accordance with one or more embodiments of the present invention. The method 600 can be executed by one or more processing units that are part of the database system 100 of FIG. 1 and/or by one or more cloud computing nodes 10 of FIG. 7. The method begins at block 602 with receiving a notification that a value of a data element, such as data element 201 of FIG. 3, stored in a source storage location, such as source table 202 of FIG. 3, in a source format has been changed to an updated value. In accordance with one or more embodiments of the present invention, the data element is a secured data element and the updated value of the data element is converted into ciphertext prior to performing the replication in block 604. The converting may result in the source format of the data element being modified (e.g., from a clear text format to an encrypted format) as well as the type (e.g., from integer to string).

At block 604, the change to the value of the data element is replicated to a plurality of target storage locations, such as target locations 304 of FIG. 3, by performing blocks 606 through 614 of FIG. 6 for each of the target storage locations. In accordance with one or more embodiments of the present invention, at least two of the target storage locations store the data element in different formats.

At block 606 a target storage location is selected, and at block 606 a target format of the data element in the target storage location is determined. As described previously, the target format of the data element can include, but is not limited to various encryption techniques, various masking techniques, various redacting techniques, and/or various randomizing of characters/elements techniques. Each of these target formats can provide different levels of data protection for the data element. At block 610 it is determined whether the target format of the data element is the same as the source format of the data element. If the target and source formats are not the same, then processing continues at block 612 with converting the updated value of the data element into the target format, and the updated value of the data element is stored in the target format at the target storage location at block 614. If the target and source formats are the same, as determined at block 610, then the updated value of the data element is stored at the storage location in the target format.

The process flow diagram of FIG. 6 is not intended to indicate that the operations of the method 600 are to be executed in any particular order, or that all of the operations of the method 600 are to be included in every case. Additionally, the method 600 can include any suitable number of additional operations.

Embodiments of the present invention facilitate creating secure data in a replicated table based on policy and database schema by having a secondary change capture table, which contains secured data. Further, embodiments of the present invention facilitate creating the secondary change capture table based on the original change capture table. A copy method is performed that includes checking data elements, such as column names, to identify fields for which secure elements are to be created in the secondary change table. Further yet, embodiments of the present invention facilitate applying changes from the secondary change capture table, with the secured data, to a new table, where queries to the database system are run against the new table, and in turn against secure data.

Figure 7:
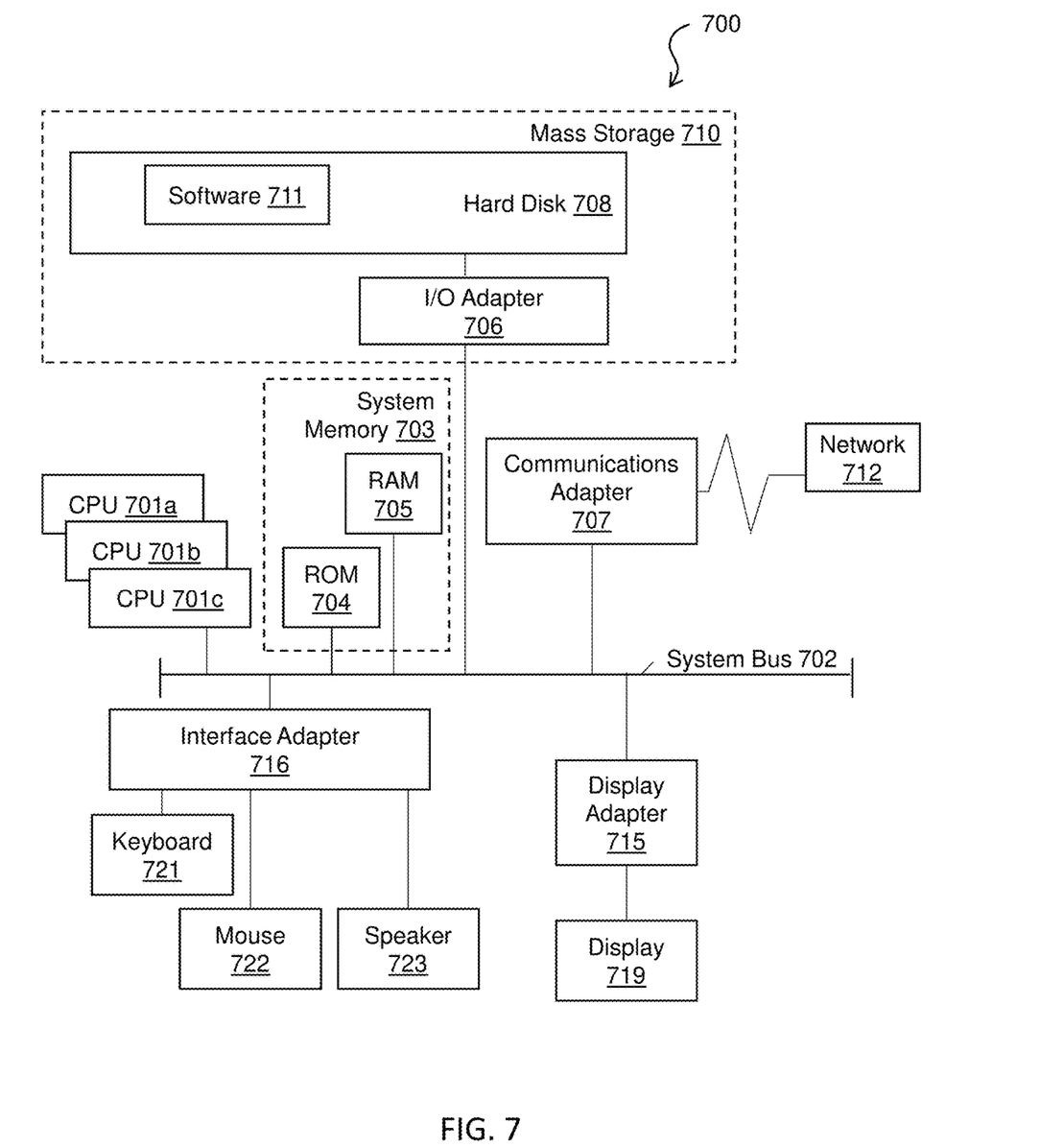
FIG. 7 is a schematic diagram of an illustrative computing device configured to implement one or more embodiments of the present invention.

Turning now to FIG. 7, a computer system 700 is generally shown in accordance with an embodiment. In accordance with one or more embodiments of the present invention, the computer system 700 is part of the database system 100 and the database system 100 and facilitates executing methods described herein. The computer system 700 is responsible for handling/providing the various functionalities of the database system 100. The computer system 700 can be an electronic, computer framework comprising and/or employing any number and combination of computing devices and networks utilizing various communication technologies, as described herein. The computer system 700 can be easily scalable, extensible, and modular, with the ability to change to different services or reconfigure some features independently of others. The computer system 700 may be, for example, a server, desktop computer, laptop computer, tablet computer, or smartphone. In some examples, computer system 700 may be a cloud computing node. Computer system 700 may be described in the general context of computer system executable instructions, such as program modules, being executed by a computer system. Generally, program modules may include routines, programs, objects, components, logic, data structures, and so on that perform particular tasks or implement particular abstract data types. Computer system 700 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 7, the computer system 700 has one or more central processing units (CPU(s)) 701a, 701b, 701c, etc. (collectively or generically referred to as processor(s) 701). The processors 701 can be a single-core processor, multi-core processor, computing cluster, or any number of other configurations. The processors 701, also referred to as processing circuits, are coupled via a system bus 702 to system memory 703 and various other components. The system memory 703 can include a read-only memory (ROM) 704 and a random access memory (RAM) 705. The ROM 704 is coupled to the system bus 702 and may include a basic input/output system (BIOS), which controls certain basic functions of the computer system 700. The RAM is read-write memory coupled to the system bus 702 for use by the processors 701. The system memory 703 provides temporary memory space for operations of said instructions during operation. The system memory 703 can include random access memory (RAM), read-only memory, flash memory, or any other suitable memory systems.

The computer system 700 comprises an input/output (I/O) adapter 706 and a communications adapter 707 coupled to the system bus 702. The I/O adapter 706 may be a small computer system interface (SCSI) adapter that communicates with a hard disk 708 and/or any other similar component. The I/O adapter 706 and the hard disk 708 are collectively referred to herein as a mass storage 710.

Software 711 for execution on the computer system 700 may be stored in the mass storage 710. The mass storage 710 is an example of a tangible storage medium readable by the processors 701, where the software 711 is stored as instructions for execution by the processors 701 to cause the computer system 700 to operate, such as is described hereinbelow with respect to the various Figures. Examples of computer program product and the execution of such instruction is discussed herein in more detail. The communications adapter 707 interconnects the system bus 702 with a network 712, which may be an outside network, enabling the computer system 700 to communicate with other such systems. In one embodiment, a portion of the system memory 703 and the mass storage 710 collectively store an operating system, which may be any appropriate operating system, such as the z/OS or AIX operating system from IBM Corporation, to coordinate the functions of the various components shown in FIG. 7.

Additional input/output devices are shown as connected to the system bus 702 via a display adapter 715 and an interface adapter 716 and. In one embodiment, the adapters 706, 707, 715, and 716 may be connected to one or more I/O buses that are connected to the system bus 702 via an intermediate bus bridge (not shown). A display 719 (e.g., a screen or a display monitor) is connected to the system bus 702 by a display adapter 715, which may include a graphics controller to improve the performance of graphics-intensive applications and a video controller. A keyboard 721, a mouse 722, a speaker 723, etc. can be interconnected to the system bus 702 via the interface adapter 716, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 7, the computer system 700 includes processing capability in the form of the processors 701, and, storage capability including the system memory 703 and the mass storage 710, input means such as the keyboard 721 and the mouse 722, and output capability including the speaker 723 and the display 719.

In some embodiments, the communications adapter 707 can transmit data using any suitable interface or protocol, such as the internet small computer system interface, among others. The network 712 may be a cellular network, a radio network, a wide area network (WAN), a local area network (LAN), or the Internet, among others. An external computing device may connect to the computer system 700 through the network 712. In some examples, an external computing device may be an external web server or a cloud computing node.

It is to be understood that the block diagram of FIG. 7 is not intended to indicate that the computer system 700 is to include all of the components shown in FIG. 7. Rather, the computer system 700 can include any appropriate fewer or additional components not illustrated in FIG. 7 (e.g., additional memory components, embedded controllers, modules, additional network interfaces, etc.). Further, the embodiments described herein with respect to computer system 700 may be implemented with any appropriate logic, wherein the logic, as referred to herein, can include any suitable hardware (e.g., a processor, an embedded controller, or an application-specific integrated circuit, among others), software (e.g., an application, among others), firmware, or any suitable combination of hardware, software, and firmware, in various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
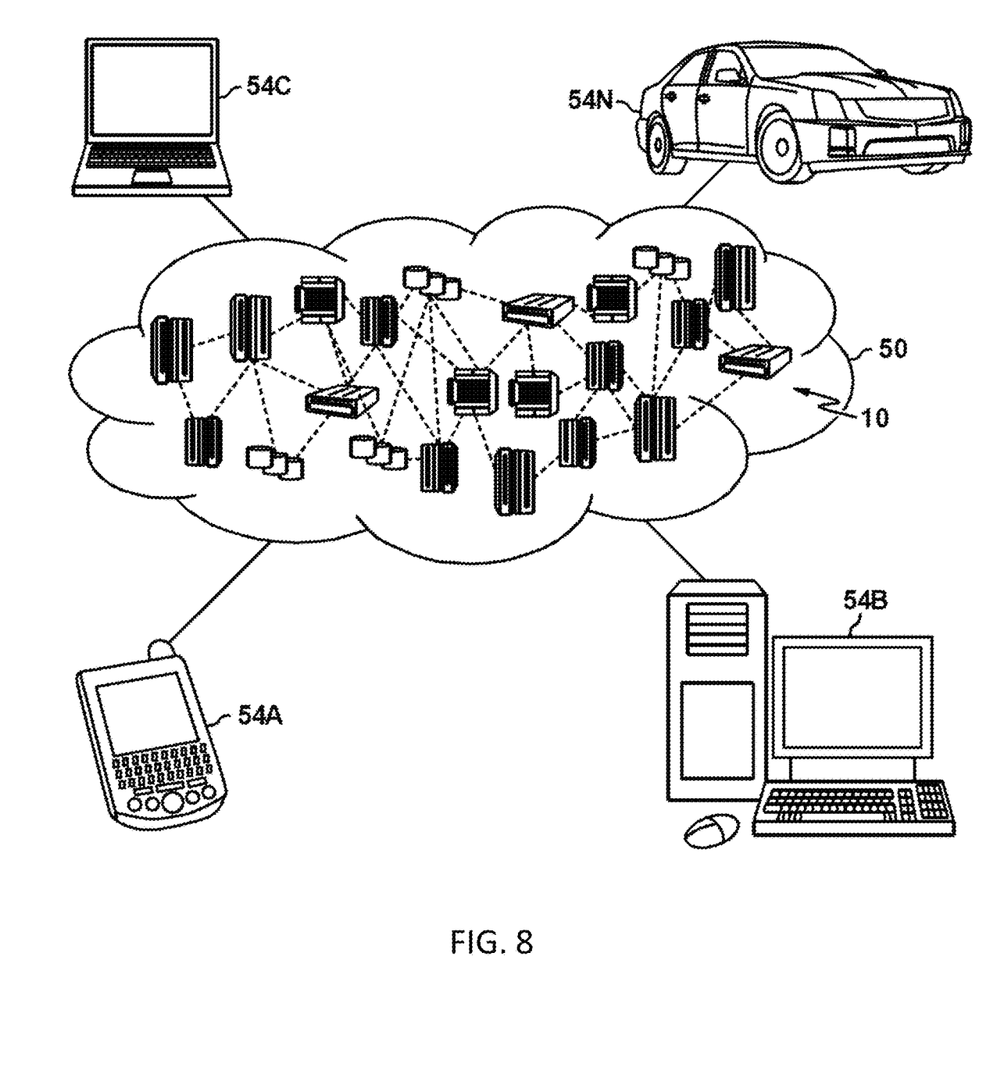
FIG. 8 depicts a cloud computing environment according to one or more embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
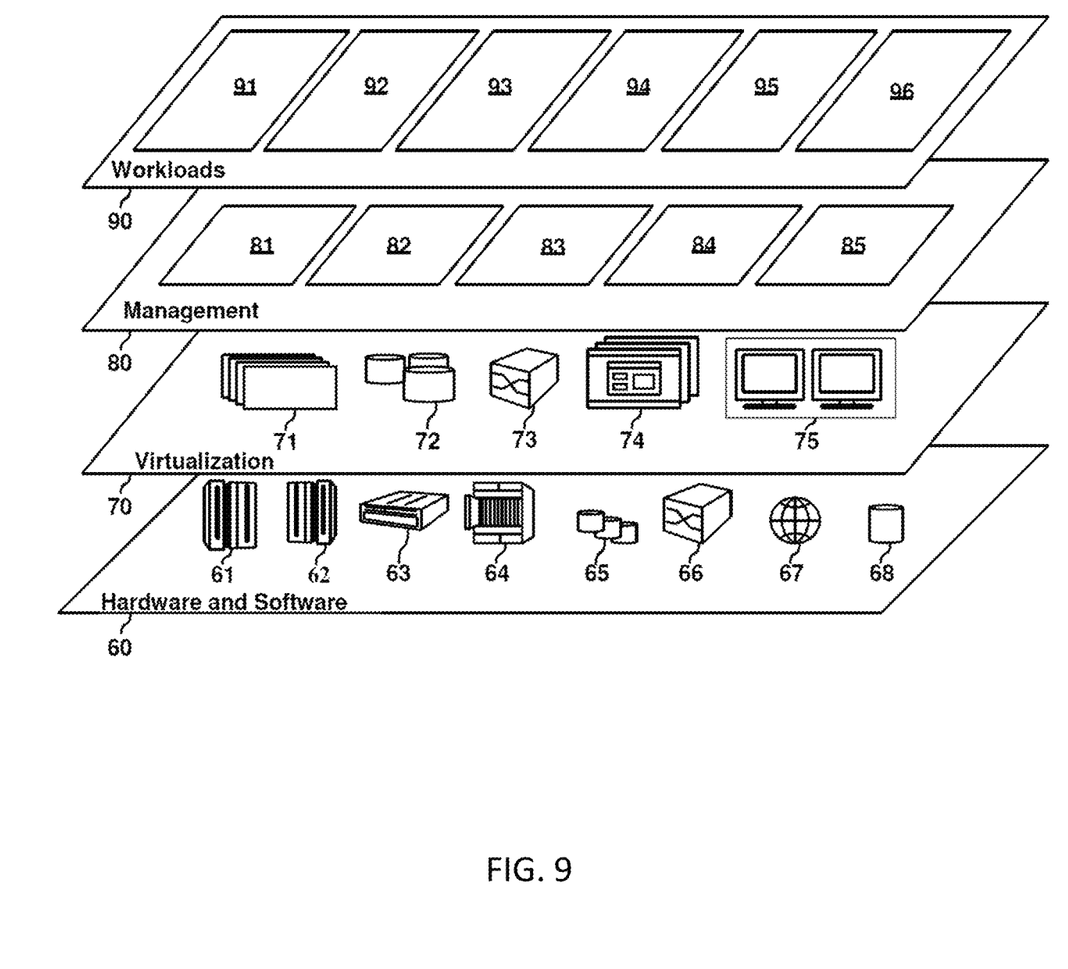
FIG. 9 depicts abstraction model layers according to one or more embodiments of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data replication 96.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or another device to cause a series of operational steps to be performed on the computer, other programmable apparatus or another device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for secure data replication in a data storage environment, the method comprising:
    receiving a notification that a value of a data element stored in a source storage location in a source format has been changed to an updated value; and
    replicating the change to a plurality of target storage locations, the replicating comprising, for each of the plurality of target storage locations:
        determining a target format of the data element in the target storage location, the target format one of a plurality of different formats, the plurality of different formats including the source format, and each of the plurality of different formats providing a different level of data protection for the data element;
        in response to determining that the target format is not the same as the source format, converting the updated value of the data element into the target format; and
        storing the updated value of the data element in the target format at the target storage location,
    wherein, for a first of the plurality of target storage locations the converting comprises applying a masking technique to the data element, and
    wherein, for a second of the plurality of target storage locations the converting comprises applying one of a redacting technique or a randomizing technique to the data element.

2. The method of claim 1, wherein the data element is a secured data element.

3. The method of claim 2, wherein prior to the replicating, the updated value of the data element is converted into a ciphertext using a security algorithm.

4. The method of claim 3, wherein the converting comprises changing the source format of the data the element.

5. The method of claim 3, wherein the updated value of the data element is derivable based on the ciphertext.

6. The method of claim 3, wherein the updated value of the data element is not derivable based on the ciphertext.

7. The method of claim 1, wherein the receiving is by a database system, the source storage location is a source database table, and the plurality of target storage locations are target database tables.

8. The method of claim 7, further comprising generating one of the plurality of target database tables based at least in part on a schema of the source database table and the target format of the data element in the one of the plurality of target database tables.

9. The method of claim 7, wherein the data element is determined to be a secured data element based on settings of the database system.

10. A system comprising:
    one or more processors for executing computer readable instructions, the computer readable instructions controlling the one or more processors to perform operations comprising:
        receiving a notification that a value of a data element stored in a source storage location in a source format has been changed to an updated value; and
        replicating the change to a plurality of target storage locations, the replicating comprising, for each of the plurality of target storage locations:
            determining a target format of the data element in the target storage location, the target format one of a plurality of different formats, the plurality of different formats including the source format, and each of the plurality of different formats providing a different level of data protection for the data element;
            in response to determining that the target format is not the same as the source format, converting the updated value of the data element into the target format; and
            storing the updated value of the data element in the target format at the target storage location,
        wherein, for a first of the plurality of target storage locations the converting comprises applying a masking technique the data element,
        wherein, for a second of the plurality of target storage loactions the converting comprises applying one of a redacting technique or a randomizing technique to the data element.

11. The system of claim 10, wherein the data element is a secured data element.

12. The system of claim 11, wherein prior to the replicating, the updated value of the data element is converted into a ciphertext using a security algorithm.

13. The system of claim 12, wherein the converting comprises changing the source format of the data the element.

14. The system of claim 10, wherein the receiving is by a database system, the source storage location is a source database table, and the plurality of target storage locations are target database tables.

15. The system of claim 14, wherein the operations further comprise generating one of the plurality of target database tables based at least in part on a schema of the source database table and the target format of the data element in the one of the plurality target database tables.

16. The system of claim 14, wherein the data element is determined to be a secured data element based on settings of the database system.

17. A computer program product comprising a computer readable storage medium having program instructions embodied therewith, the program instructions executable by one or more processors to cause the one or more processors to perform operations comprising:

receiving a notification that a value of a data element stored in a source storage location in a source format has been changed to an updated value; and     replicating the change to a plurality of target storage locations, the replicating comprising, for each of the plurality of target storage locations:

determining a target format of the data element in the target storage location, the target format one of a plurality of different formats, the plurality of different formats including the source format, and each of the plurality of different formats providing a different level of data protection for the data element;

in response to determining that the target format is not the same as the source format, converting the updated value of the data element into the target format; and         storing the updated value of the data element in the target format at the target storage location,         wherein, for a first of the plurality of target storage locations the converting comprises applying a masking technique to the data element, and         wherein, for a second of the plurality of target storage locations the converting comprises applying one of a redacting technique or a randomizing techinque to the data element.

18. The computer program product of claim 17, wherein the receiving is by a database system, the source storage location is a source database table, and the plurality of target storage locations are target database tables.

\* \* \* \* \*